US011543552B2

(12) United States Patent
Wu et al.

(10) Patent No.: US 11,543,552 B2
(45) Date of Patent: Jan. 3, 2023

(54) DETERMINING DISTANCE TO BED BOUNDARY UNCERTAINTY FOR BOREHOLE DRILLING

(71) Applicant: Halliburton Energy Services, Inc., Houston, TX (US)

(72) Inventors: Hsu-Hsiang Wu, Sugarland, TX (US); Jin Ma, Houston, TX (US); Clint Lozinsky, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 88 days.

(21) Appl. No.: 16/723,605

(22) Filed: Dec. 20, 2019

(65) Prior Publication Data
US 2021/0190987 A1 Jun. 24, 2021

(51) Int. Cl.
*G01V 1/50* (2006.01)
*E21B 47/12* (2012.01)
*E21B 7/06* (2006.01)

(52) U.S. Cl.
CPC ............... *G01V 1/50* (2013.01); *E21B 47/12* (2013.01); *E21B 7/06* (2013.01); *G01V 2210/30* (2013.01); *G01V 2210/667* (2013.01)

(58) Field of Classification Search
CPC ......... A01B 43/00; B02C 19/11; B24B 41/00; C09K 8/02; G01V 1/02; G10K 11/00
See application file for complete search history.

(56) References Cited

U.S. PATENT DOCUMENTS

| 6,594,584 | B1* | 7/2003 | Omeragic | G01V 3/28 |
| | | | | 702/9 |
| 2002/0149997 | A1 | 10/2002 | Zhang | |
| 2006/0017443 | A1 | 1/2006 | Folberth | |
| 2011/0133740 | A1* | 6/2011 | Seydoux | G01V 3/28 |
| | | | | 324/338 |
| 2013/0054191 | A1* | 2/2013 | Kaipio | G01F 23/268 |
| | | | | 702/156 |
| 2015/0142320 | A1 | 5/2015 | Wu | |
| 2016/0003973 | A1 | 1/2016 | Guner | |
| 2017/0261631 | A1 | 9/2017 | Donderici | |
| 2019/0128116 | A1* | 5/2019 | Thiel | G01V 3/30 |

OTHER PUBLICATIONS

Wikipedia Contributors. (2019e, Dec. 10). Additive White Gaussian Noise. Wikipedia. Retrieved Apr. 4, 2022, from https://web.archive.org/web/20191210064121/https://en.wikipedia.org/wiki/Additive_white_Gaussian_noise (Year: 2019).*

* cited by examiner

*Primary Examiner* — Daniel R Miller
*Assistant Examiner* — Eric Sebastian Von Wald
(74) *Attorney, Agent, or Firm* — K&L Gates LLP

(57) ABSTRACT

A system and method for determining an uncertainty of a distance to bed boundary (DTBB) inversion of a geologic formation. The system or method includes receiving logging data from a borehole tool, performing a first DTBB inversion using the logging data to calculate first DTBB solutions, adding quantified noise to the logging data to produce an adjusted signal, performing a second DTBB inversion using the adjusted signal to calculate second DTBB solutions, comparing the first DTBB solutions to the second DTBB solutions to determine an uncertainty of the first DTBB solutions based on a relationship of the quantified noise and the difference between the first DTBB solutions and the second DTBB solutions.

20 Claims, 5 Drawing Sheets

DETERMINING DISTANCE TO BED BOUNDARY UNCERTAINTY FOR BOREHOLE DRILLING

BACKGROUND

This section is intended to provide relevant background information to facilitate a better understanding of the various aspects of the described embodiments. Accordingly, it should be understood that these statements are to be read in this light and not as admissions of prior art.

Petroleum drilling and production operations demand information relating to the parameters and conditions downhole to create the most productive drilling operations. Such information may include the location and orientation of the borehole and drilling assembly, properties of the various formations along the borehole, and parameters of the downhole drilling environment. The collection of information relating to formation properties and downhole conditions is typically done using logging tools, and is referred to as "logging." Logging can be performed during the drilling process itself (i.e., logging while drilling "LWD," or measurement while drilling "MWD").

Physical properties in the formation change signals received by the logging tools. The change can vary depending on the characteristics of the transmitted signal, but a comparison of the transmitted signal and the received signals can be used to measure formation properties. In some cases, the amplitude and/or phase of multiple received signals are compared to each other to measure the formation resistivity. When plotted as a function of depth or tool position in the borehole, the resistivity tool measurements are termed "logs." The logs are used to generate a layered image that can identify major boundaries between different formations. The process of determining a physical property of the formation from the logs is known as inversion. That is, the inversion takes the log and uses an algorithm to calculate distance-to-bed-boundaries (DTBB) based on models of previously logged formations with known formation properties. This is known as a DTBB inversion.

BRIEF DESCRIPTION OF THE DRAWINGS

Embodiments useful in steering a borehole including determining uncertainty on distance to bed boundary inversion are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides a method to quantify the inversion uncertainty by introducing additional noise into the measurements used in model-based inversions projecting properties of geologic formations.

Figure 1:
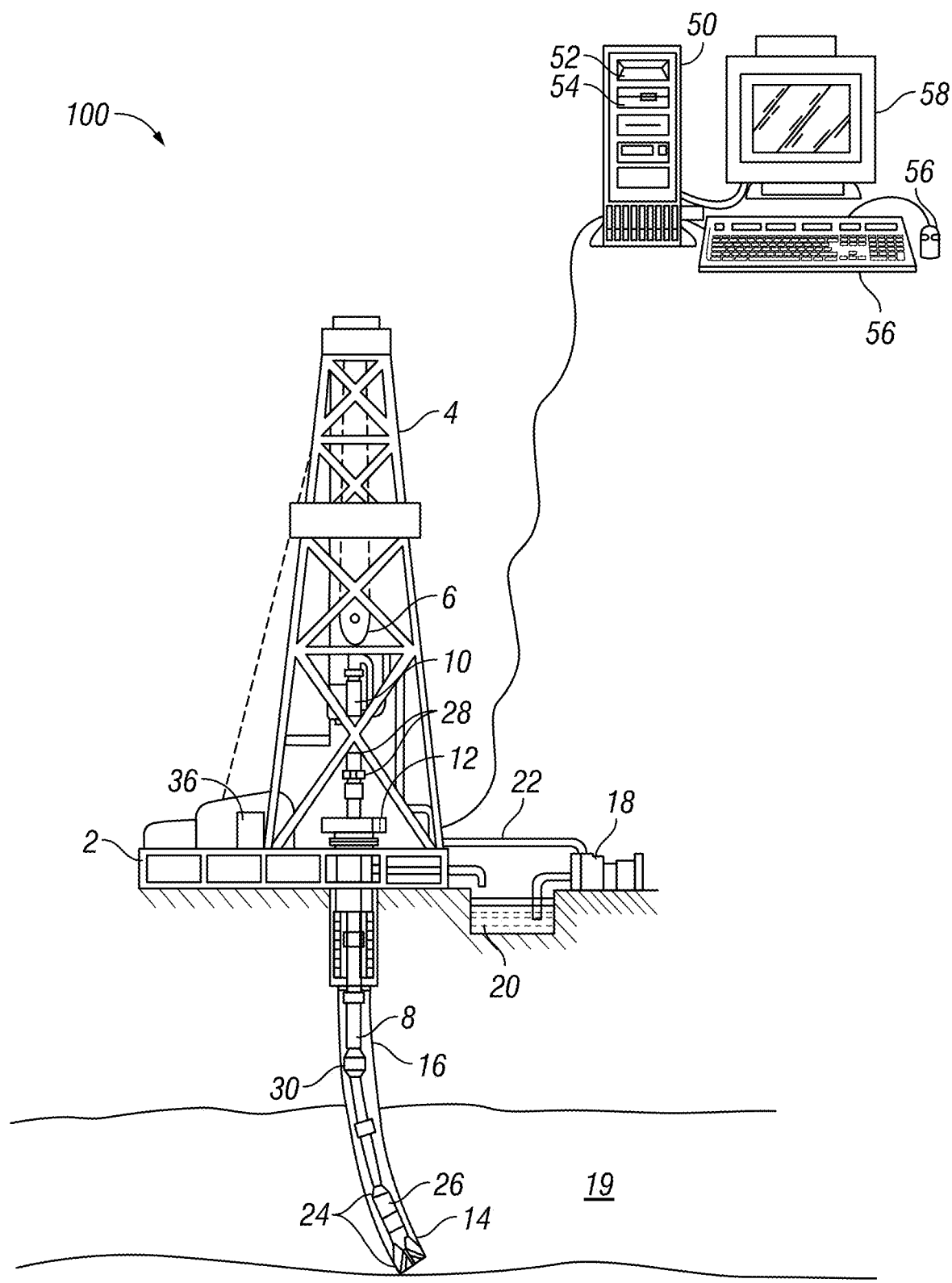
FIG. 1 is an elevation view of a logging-while-drilling (LWD) environment, according to one or more embodiments.

FIG. 1 shows a representative embodiment of a system 100 within a logging-while-drilling (LWD) environment. As part of the system 100, a drilling platform 2 supports a derrick 4 having a traveling block 6 for raising and lowering a drill string 8 and a drilling assembly 24. A top drive 10 supports and rotates the drill string 8 as it is lowered through the wellhead 12. The drilling assembly includes a drill bit 14 driven by a downhole motor and/or rotation of the drill string 8. As the drill bit 14 rotates, it creates a borehole 16 that passes through various geologic formations 19. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

In addition to the drill bit 14, the drilling assembly 24 may also include a mud motor and one or more drill collars that provide weight and rigidity to aid the drilling process. The tool orientation, or the steering direction of the drilling assembly 24, may be specified in terms of a tool face angle (rotational orientation), an inclination angle (the slope), and compass direction, each of which can be derived from measurements by magnetometers, inclinometers, and/or accelerometers located in the drill collars, though other sensor types such as gyroscopes may alternatively be used. In one embodiment, the tool includes a 3-axis fluxgate magnetometer and a 3-axis accelerometer. The combination of these two sensor systems enables the measurement of the tool face angle, inclination angle, and compass direction. Such orientation measurements can be combined with gyroscopic or inertial measurements to accurately track tool position.

The drilling assembly 24 may also include a borehole tool 26 (or multiple borehole tools 26) for measuring formation properties that may include formation resistivity, formation gamma ray intensity, inclination, and azimuth of the drill string 8, borehole pressure, borehole temperature, or other properties of the formation or the drilling assembly 24. The borehole tool 26 uses telemetry to maintain a communications link with the surface and sending a signal of the measured formation properties, referred herein to as a logging data. Mud pulse telemetry is one common telemetry technique for transferring tool measurements to surface receivers and receiving commands from the surface, but other telemetry techniques can also be used. For some techniques (e.g., through-wall acoustic signaling) the drill string 8 includes one or more repeaters 30 to detect, amplify, and re-transmit the logging data. At the surface, transducers 28 may be used to convert signals between mechanical and electrical form, enabling a network interface module 36 to receive the uplink signal from the drilling assembly 24 and/or the repeaters 30 and also potentially transmit a downlink signal to the drilling assembly 24.

The system 100 also includes a computer system 50 located at the surface that receives the logging data from the borehole tool 26. Although FIG. 1 depicts the computer system 50 as being hardwired to the rest of the system 100, it should be appreciated that the computer system 50 may wirelessly communicate to receive the logging data. The computer system 50 includes a processor 52 capable of executing instructions and a non-transitory machine-readable medium 54 (e.g., ROM, EPROM, EEPROM, flash memory, RAM, a hard drive, a solid state disk, an optical disk, or a combination thereof) for storing instructions executed by the processor 52. The processor 52 may include one or more processors located at the surface or in the borehole, such as integrated with the drilling assembly 24. The non-transitory machine-readable medium 54 governs the operation of the computer system 50. A user interacts with the computer system 50 and the non-transitory machine-readable medium 54 via one or more input devices 56 and one or more output devices 58. The computer system 50 may also be used to control the drilling direction of the drilling assembly 24 (e.g., modifying the borehole trajectory by steering the drill bit 14) by communicating commands to the drilling assembly 24 to execute for steering the drilling assembly. The computer system 50 is operable to perform calculations or operations to, among other things, evaluate the formation, identify formation boundary positions, and/or steer the drill bit 14 as further described herein.

The system 100 shown in FIG. 1 illustrates a directional drilling operation, wherein drilling is performed along a path other than a straight vertical path downward. The change in direction may be achieved using a "bent sub," which is a tubular section along the drill string 8 near the drill bit 14 that is bent or curved. The bend or curve may be fixed or variable, with the direction of the drilling being determined either by the bend alone, or by a combination of the bend and the rotation of the drill string 8. For example, if a downhole motor is used to drive the drill bit 14 and a drill string 8 with a fixed bent sub is maintained at a fixed azimuthal orientation, the drill string 8 will gradually change direction towards the direction of the bend. If instead the drill string 8 is rotated, drilling will progress along a line parallel to the drill string section above the bend and about which the drill bit 14 processes.

For drill strings capable of varying the angle of the bent sub, the sub is set to a desired angle and direction while the drill string 8 is maintained at a desired fixed azimuthal orientation, with the drill bit 14 being driven by the downhole motor. In other embodiments, the drill string 8 continues to be rotated and the angle of the bent sub is maintained by applying a force on the drill string 8 in a specific direction. This causes the sub to be pushed into the borehole wall opposite the desired drilling direction to create an angle between the drill string pipes and/or drilling assembly 24 to either side of the sub. Such systems are sometimes referred to as rotary steerable systems. The controls of the drilling assembly 24 may be controlled to direct the borehole 16 along a desired path, as detected by the logging tools 26 and described further herein.

Figure 2:
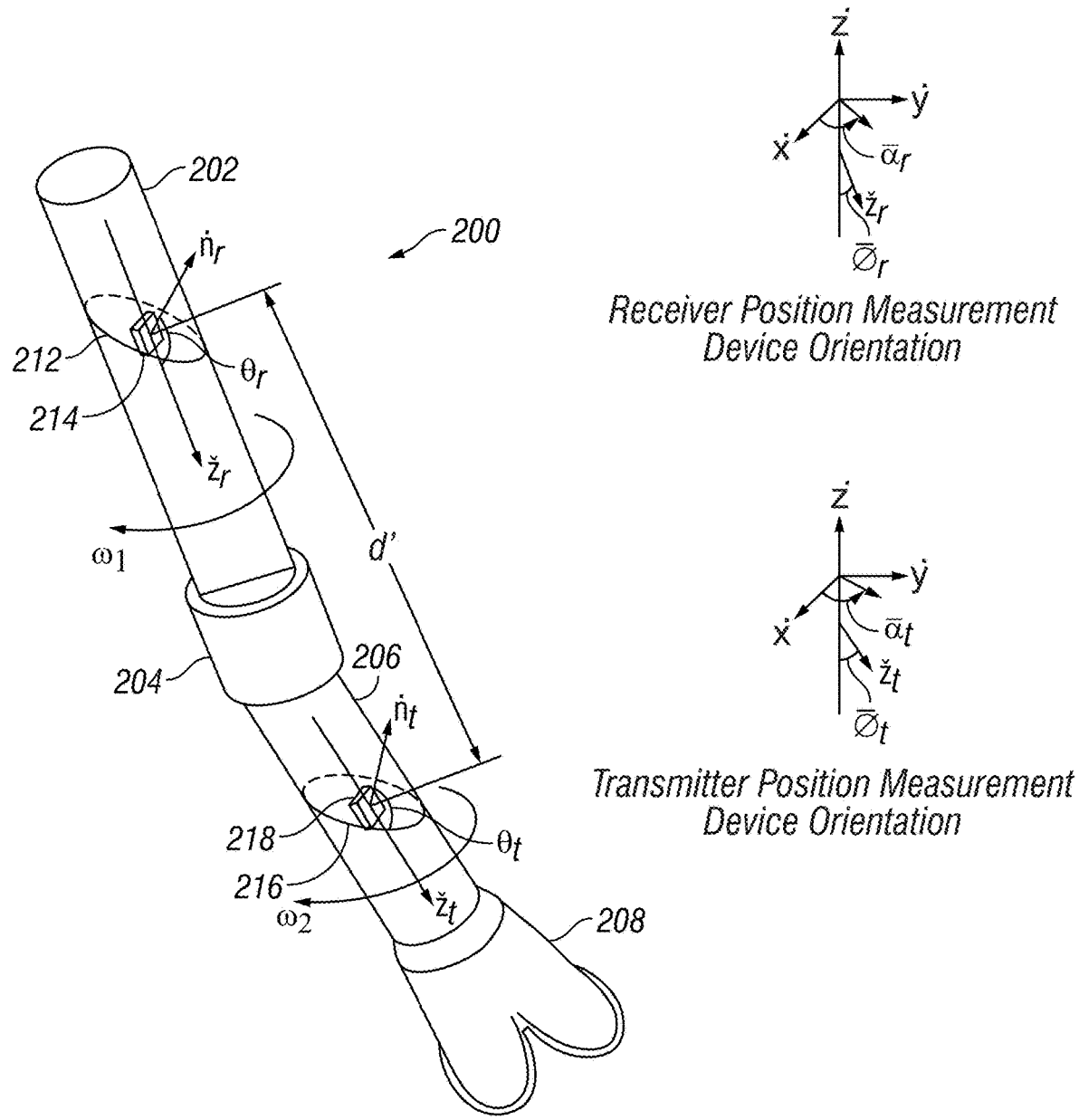
FIG. 2 is a schematic view of a resistivity logging tool, according to one or more embodiments.

FIG. 2 shows a schematic view of a logging-while-drilling (LWD) tool 200, in accordance with one or more embodiments. The LWD tool 200 may be included with/within the drilling assembly 24 of FIG. 1 and includes, for example, two LWD tool subs 202 and 206 at different locations and orientations along a drill string next to a drill bit 208. The LWD tools subs 202, 206 control the orientation of the drill bit 208, and the transmission/reception of the logging data. A receive antenna 212 and a corresponding receive antenna position measurement device 214 are housed within the LWD tool sub 202 further from the drill bit 208, while a transmit antenna 216 and a corresponding transmit antenna position measurement device 218 are housed within the LWD tool sub 206 and closer to the drill bit 208. The position measurement devices 214, 218 locate the position of each corresponding antenna 212, 216, which may be expressed, for example, in terms of each antenna's 212, 216 tilt angle ($\theta_r$ and $\theta_t$ relative to the $z_r$ and $z_t$ axes respectively; generally fixed and known), each antenna's 212, 216 azimuthal angle ($\alpha_r$ and $\alpha_t$ relative to the x axis), each LWD tool sub's inclination angle ($\phi_r$ and $\phi_t$) and the distance d' between the antennas 212, 216. Various methods may be used to locate the antenna 212, 216 positions (e.g., relative to a reference position on the surface. It should be noted that although the bent sub angles are typically less than five degrees, the illustration shown has a much more pronounced angles to better illustrate the effect of the angles on the relative spatial locations of the antennas 212,216.

The LWD tool 200 in communication with the computer system 50 of FIG. 1 is used to measure formation data, which is used to evaluate the formation and/or determine a borehole trajectory to produce formation fluids, such as hydrocarbon fluids. It should be appreciated that the LWD tool 200 is an exemplary tool for measuring formation data and other suitable logging tools may be used. Also, other logging tools may employ different antenna configurations to evaluate the formation.

The formation data measured is used to generate a resistivity model of the formation used to identify DTBB positions between formation layers and determine the borehole trajectory to produce formation fluids. The formation data measured is also used to determine the uncertainty of a parameter included in or determined from the formation data. For example, the parameter may be any one or any combination of a horizontal resistivity, vertical resistivity, conductivity, an anisotropy ratio, a boundary position of formation layers, and a formation dip. As used herein, the uncertainty of a parameter refers to a range of suitable values for the parameter or a measure that is used to quantify a variation in the parameter (e.g., standard deviation). The uncertainty of a parameter may include, for example, the uncertainty of resistivity values or boundary positions of formation layers. For instance, the uncertainty of a boundary position provides an indication of where a formation boundary may be located and the extent to which that formation boundary position may vary. The uncertainty of other parameters may also be determined as explained further herein.

Figure 3:
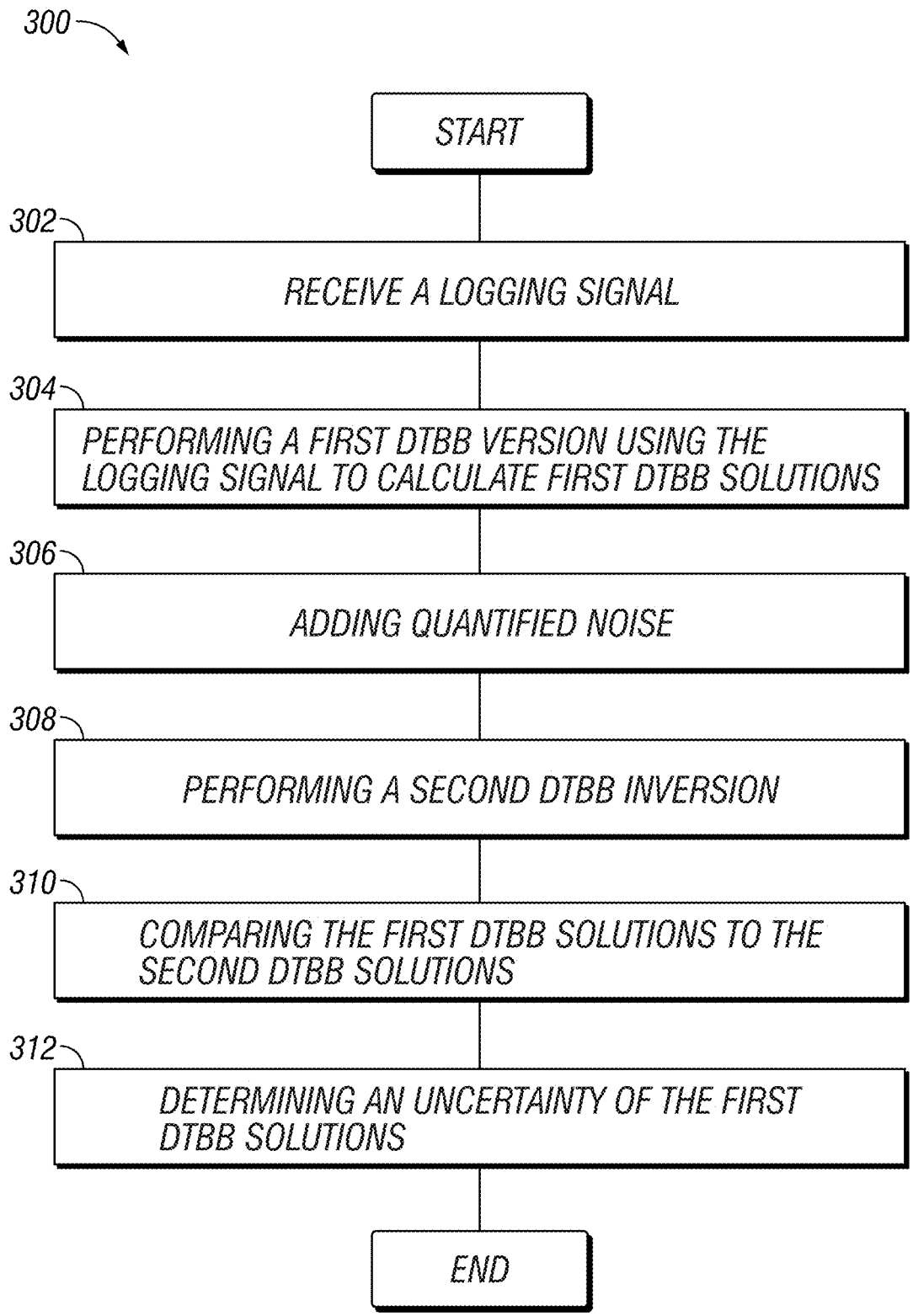
FIG. 3 is a flowchart of a process for determining an uncertainty of a DTBB inversion of a geologic formation, according to one or more embodiments.

FIG. 3 shows a flow chart of a method 300 to generate a formation model using formation data, and determine an uncertainty of a DTBB inversion of a geologic formation with a borehole logging and/or drilling system, such as the system 100 of FIG. 1, in accordance with one or more embodiments. The process of determining a physical property of the formation from measurements such as the logging data is known as inversion. That is, performing a DTBB inversion involves using an algorithm to calculate DTBBs using the logging data. The algorithm (or algorithms) are based on models correlating previously logged formation data with known properties of the logged formation.

Figure 4:
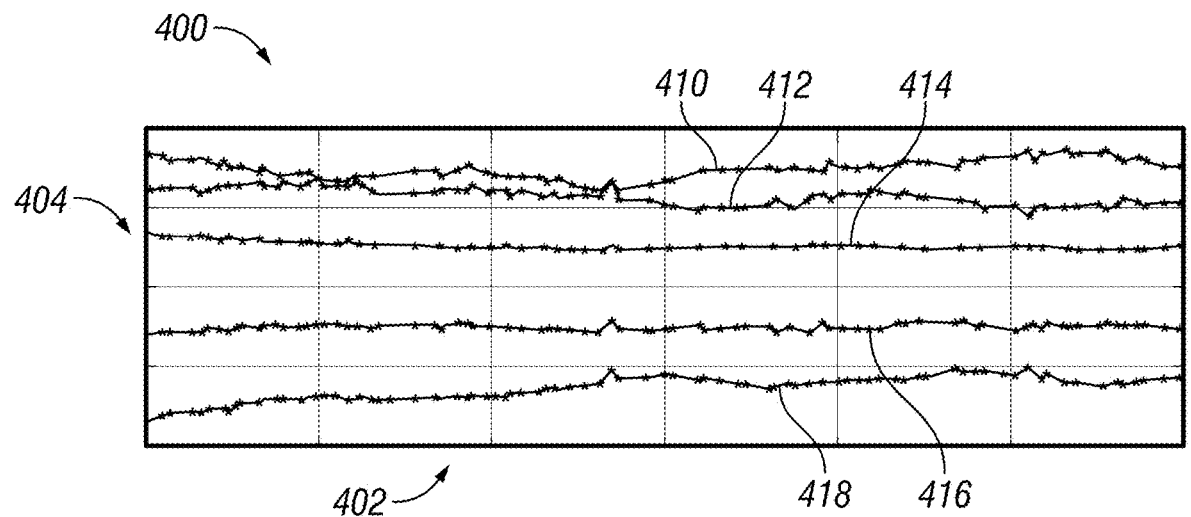
FIG. 4 is a graph of logging data, according to one or more embodiments.

At block 302, the system running the method 300 receives logging data from the LWD tool. FIG. 4 is a graph 400 of received logging data 410-418 such as the logging data that may be received at block 302 of the method 300, according to one or more embodiments. The logging data may be received at the computer system 50 from the borehole tool 26 or the LWD tool 200. The logging data 410-418 in the embodiment of FIG. 4 are presented as a value for a given location within the geologic formation. The abscissa 402 of the graph 400 in the illustrated embodiment represents the measured depth of the logging tool (e.g., borehole tool 26)

at the time the logging tool collected the data, and the ordinate 404 of the graph 400 represents the attenuation of the signal. In other instances of the graph 400, other values such as formation resistivity, gamma may be received and plotted. The logging data 410-418 are from five different logging tools or five different transmitted signals. More or fewer logging data may be used within the scope of the disclosed embodiments.

Figure 5:
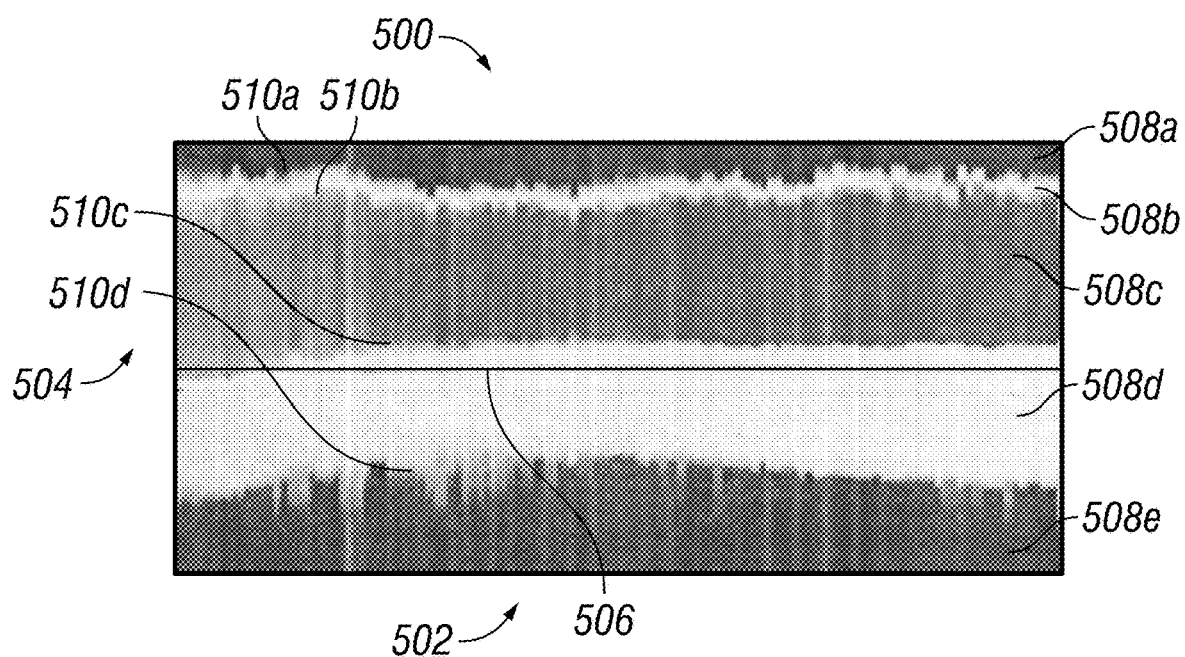
FIG. 5 is a graph of DTBB solutions, according to one or more embodiments.

At block 304, a first DTBB inversion is performed using the logging data to calculate first DTBB solutions. The inversion approach can be deterministic gradient-based linear or non-linear regression algorithms like Gauss-Newton method, or statistic optimization methods like Monte-Carlo method or Neural Network method, or a combination of the deterministic and statistic inversion methods. FIG. 5 is a graph 500 of DTBB solutions, according to one or more embodiments. The graph 500 is generated by the inversion of the logging data represented in FIG. 4. As stated earlier, performing a DTBB inversion involves manipulating the logging data with a model. Various models are used in the inversion process to convert the logging data to DTBB solutions. Different models may be preferred for logging data collected at particular boreholes, or for particular logging tools. While one model may be preferred for a particular borehole and logging tool, additional inversions may be repeated with different models to confirm the uncertainty indicated by the first inversion.

Whatever model is used for the inversion, the graph 500 may display the result of the inversion using an abscissa of measured depth 502 of the geologic formation and an ordinate 504 of true-vertical-depth to illustrate formation properties. In the illustrated embodiment, the logging data was taken as the logging tool passed along a horizontal well path 506. The inversion shows the different formation properties as bands 508a-508e, with DTBB solutions 510a-510d between them, such that each band 508a-508e represents a different value of a property. For example, in some graphs 500, the bands 508a-508e may represent different values of resistivity.

The DTBB solutions 510a-510d between the bands 506a-506e are not always abrupt. This is true both geologically, where the geologic formation has properties that change slowly from one property value to another, and in the inversion, where noise or other distortion of the logging data can obscure the inversion. It is not always possible, therefore, to determine the degree of uncertainty of the boundary with the DTBB solutions 510a-510d. A boundary in the inversion, for example, a third DTBB solution 510c in the illustrated embodiment, may appear crisp in the inversion graph 500, but the uncertainty may not be as crisp. Likewise, a gradual boundary change, such as that shown in the fourth DTBB solution 510d, may actually be due mostly to limitations within the system 100 that manifest as noise that distorts the logging data.

At block 306, quantified noise is added to the logging data to produce an adjusted signal. The quantified noise may include a specific type of noise that is prevalent in the logging data. The type of noise may be determined either by transforming the logging data (e.g., Fourier transform) or by comparing the signal to similar signals with known types of noise. For example, a nearby borehole that has had additional/more thorough logging conducted therein may show similar Gaussian noise in the logging data. Thus, the similar nearby borehole likely includes this type of noise as well, and the quantified noise may be added as Gaussian noise. Other types of noise, such as white noise or random noise may also be included. The logging data that includes the quantified noise is called an adjusted signal.

At block 308, a second DTBB inversion is performed using the adjusted signal to calculate second DTBB solutions. At block 310, the first DTBB solutions are compared to the second DTBB solutions to determine an uncertainty of the first DTBB solutions at block 312. For example, the first DTBB solutions from the unchanged logging data may indicate a first distance of the boundary. The second DTBB solution, with the quantified noise added to the signal, may indicate a second distance. If the second DTBB solutions are far (1m or more) from the first DTBB solutions, then the quantified noise is changing the logging data significantly and indicates that the logging data itself did not contain much noise. The comparison determines that the first DTBB solutions have a low degree of uncertainty. On the other hand, if the second DTBB solutions are not far (less than 1 m) from the first DTBB solutions, then the quantified noise is not changing the logging data significantly, which indicates a higher degree of uncertainty.

The determination of the uncertainty from block 312 may then be used to inform more information regarding the structure of the formation. For example, the uncertainty may be used to adjust calculations and models used in steering the drilling assembly 24 of FIG. 1. The uncertainty determination from block 312 may be communicated to the computer system 50, which may use the determination to control the drilling direction of the drilling assembly 24 (e.g., modifying the borehole trajectory by steering the drill bit 14) by communicating commands to the drilling assembly 24 to execute for steering the drilling assembly. As described above, the computer system 50 is operable to perform calculations or operations to, among other things, evaluate the formation, identify formation boundary positions, and/or steer the drill bit 14.

All, or portions, of the method 300 may be repeated to confirm or adjust the uncertainty of the first DTBB solutions. For example, a second model (i.e., utilizing a second algorithm) may be used to perform the inversion to calculate an alternative set of first DTBB solutions, with the rest of the method 300 proceeding similarly. After performing an alternative first DTBB inversion using a different inversion model (i.e., repeating block 304 of the method 300), the method 300 may include performing an alternative second DTBB inversion (i.e., repeating block 308 of the method 300) using the different inversion model and the same adjusted signal that was used the first time the method 300 was run (i.e., at block 306). In this manner, the second algorithm may utilize the output from the first model as a baseline and initial guess for the inversion, and invert only the model parameters related to the uncertainty evaluation. For example, the second algorithm can be implemented as pixelating the inversion results from the first model and only perturb the pixels within the range of the boundary uncertainty in the inversion engine. As a result, the second algorithm is purpose-oriented and faster in computation speed, thus accelerating the process as there may be thousands of noise models for the uncertainty calculation.

Repeating blocks 304, 306, and 308 calculates alternative second DTBB solutions. Then, the method 300 may compare (i.e., repeating block 310) the alternative first DTBB solutions (i.e., the value of the uncertainty determined by the first iteration of the method 300) to the alternative second DTBB solutions to determine an alternative uncertainty (i.e., repeating block 312). The alternative uncertainty confirms the uncertainty of the first DTBB solutions if the alternative uncertainty is similar to the first uncertainty. The similarity determination can be realized using modern machine learning methods or clustering methods like K-means, etc. If the alternative uncertainty is different from the first uncertainty (and does not confirm the uncertainty), further repetition of the method 300 may be used to confirm the uncertainty by establishing a pattern between the various uncertainty values. The alternative uncertainties may also be used by the computer system 50 in controlling the drilling direction of the drilling assembly 24.

Figure 6:
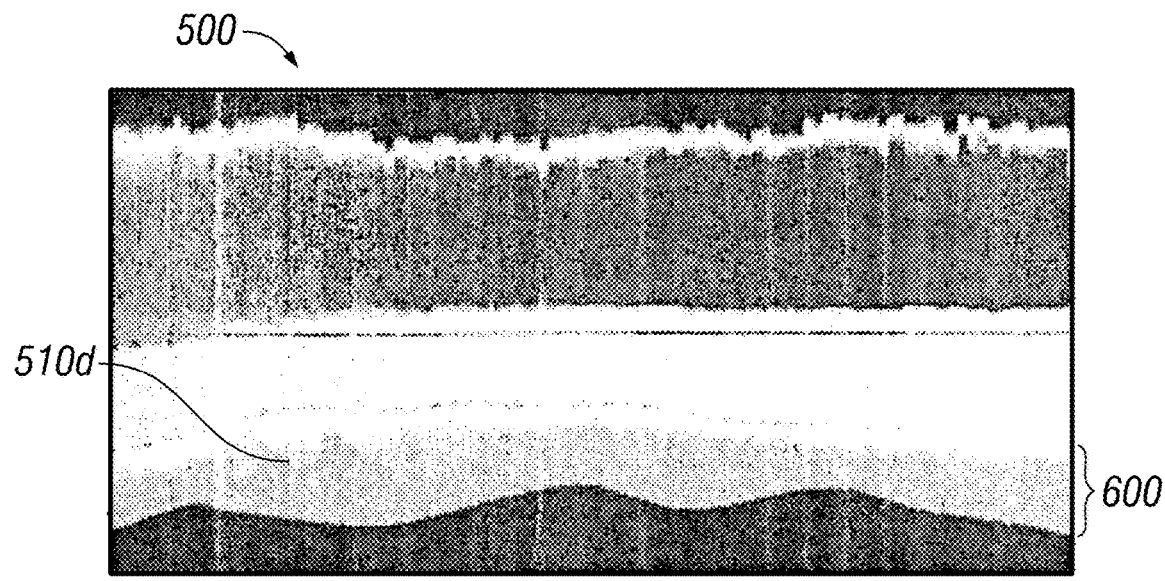
FIG. 6 is a graph of DTBB solutions, according to one or more embodiments.

In one or more embodiments, a subset of the logging data may be selected to receive additional noise. FIG. 6 is a graph of the DTBB solutions of FIG. 5 but also having an area of interest 600 overlaid on the graph 500. The area of interest 600 represents a subset of the logging data to which additional quantified noise is to be added. The area of interest 600 may be chosen for a number of reasons. For example, the area of interest 600 may appear to have more noise, or less noise, or may be located at a specific depth of the formation that should have production fluid, or some other geologic feature that should be inspected more closely. The system 100 and method 300 may include performing the second inversion only on the subset of the logging data represented by the area of interest 600.

Figure 7:
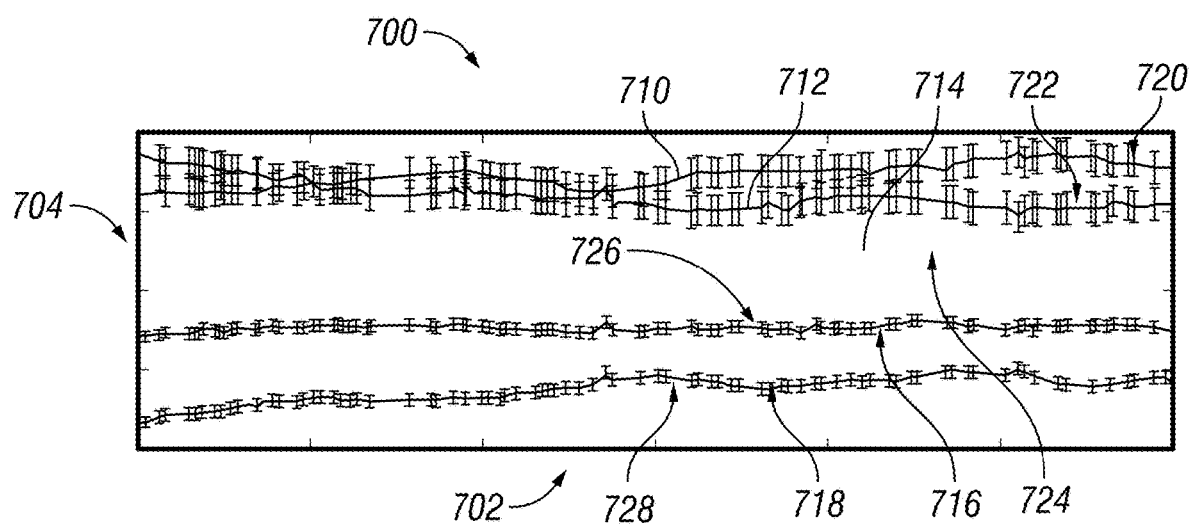
FIG. 7 is a graph of logging data having error bars overlaid thereon, according to one or more embodiments.

FIG. 7 is a graph 700 of logging data having error bars overlaid thereon, according to one or more embodiments. The graph 700 includes an abscissa 702 and an ordinate 704 that represents the measured depth of the logging tool and the attenuation of the signal, respectively, as in FIG. 4. The graph 700 also shows five logging data lines 710-718. Each logging data line 710-718 has an error bar 720-728 overlaid thereon to show the degree of uncertainty for that particular logging data. The uncertainty comes from noise within the logging data, and can differ between logging data, as shown. That is, some logging data (first logging signal 710 and second logging signal 712) may have higher uncertainty (first error bars 720 and second error bars 722), while other logging data (third logging signal 714) may have lower uncertainty (third error bars 724).

It should be appreciated that the systems and methods described herein provide a solution rooted in downhole logging tools in order to overcome a problem specifically arising from inversion methods used to determine formation properties from the formation data measured using the logging tools. Inversion methods using formation data from the logging tools can provide hundreds of solutions at a single measurement depth of the logging tool, with each solution having unknown uncertainties. The methods and system described herein determine the uncertainty of the inversion solutions using an added quantified noise and comparing the logging data with the added noise and without the added noise. In such application, the difference could be a value of a distance from the original boundary position, resulted from adding a noise in the original inversion input.

One or more specific embodiments of determining uncertainty on distance to bed boundary inversions have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

One or more embodiments may include a method of steering a drilling assembly to form a borehole. The method may include receiving logging data from a borehole tool, performing a first DTBB inversion using the logging data to calculate first DTBB solutions, adding quantified noise to the logging data to produce an adjusted signal, performing a second DTBB inversion using the adjusted signal to calculate second DTBB solutions, and comparing the first DTBB solutions to the second DTBB solutions to determine an uncertainty of the first DTBB solutions based on a relationship of the quantified noise and the difference between the first DTBB solutions and the second DTBB solutions.

In one ore more embodiments, the borehole tool comprises a logging-while-drilling (LWD) tool for generating the logging data. In certain embodiments, the logging data may include resistivity, gamma ray intensity, borehole pressure, borehole temperature, or any combination thereof associated with depth from surface in the geologic formation.

In one ore more embodiments, the method includes steering a drilling assembly through the geologic formation based on the uncertainty of the first DTBB solutions. The method may also include determining a type of noise present in the logging data, wherein the quantified noise comprises noise of the type present in the logging data. Also, the quantified noise may include Gaussian noise, white noise, random noise, or combinations thereof.

In one ore more embodiments, the method includes selecting a subset of the logging data to add to the quantified noise, wherein the subset comprises tool measurements from a specific depth from the surface within the geologic formation, and wherein performing the second DTBB inversion comprises using only the subset of the logging data.

In one ore more embodiments, the method includes performing an alternative first DTBB inversion using a different inversion model to calculate alternative first DTBB solutions, performing an alternative second DTBB inversion using the different inversion model to calculate alternative second DTBB solutions, and comparing the alternative first DTBB solutions to the alternative second DTBB solutions to confirm the uncertainty of the first DTBB solutions.

One or more embodiments may also include a system for drilling a borehole through a geologic formation. The system may include a processor, and a non-transitory machine-readable medium coupled to the processor. The memory may include instructions configured to cause the processor to perform operations for: receiving logging data from a borehole tool, performing a first distance to bed boundary (DTBB) inversion using the logging data to calculate first DTBB solutions, adding quantified noise to the logging data to produce an adjusted signal, performing a second DTBB inversion using the adjusted signal to calculate second DTBB solutions, comparing the first DTBB solutions to the second DTBB solutions to determine an uncertainty of the first DTBB solutions based on a relationship of the quantified noise and the difference between the first DTBB solutions and the second DTBB solutions.

In one ore more embodiments, systems may include a logging tool having sensors operable to collect the logging data from the geologic formation. The system may also include a drilling assembly. The memory may include instruction configured to cause the processor to change an orientation of the drilling assembly, change an angle of the drilling assembly relative to a drill string, or combination thereof based on the uncertainty of the first DTBB solutions.

In one ore more embodiments, the memory comprises instruction configured to cause the processor to perform operations for determining a type of noise present in the logging data, wherein the quantified noise comprises noise of the type present in the logging data.

In one ore more embodiments, the memory comprises instruction configured to cause the processor to select a subset of the logging data to add the quantified noise to, wherein the subset comprises tool measurements from a specific depth from surface within the geologic formation, and wherein performing the second DTBB inversion comprises performing the inversion only on the subset of the logging data.

In one ore more embodiments, the memory comprises instruction configured to cause the processors to perform operations for performing an alternative first DTBB inversion using a different inversion model to calculate alternative first DTBB solutions, performing an alternative second DTBB inversion using the different inversion model to calculate alternative second DTBB solutions, comparing the alternative first DTBB solutions to the alternative second DTBB solutions to confirm the uncertainty of the first DTBB solutions.

One or more embodiments may include a non-transitory, machine-readable medium having instructions encoded thereon, the instructions, when executed by a processor, are operable to perform operations for: receiving logging data from a borehole tool located in a geologic formation, performing a first DTBB inversion using the logging data to calculate first DTBB solutions, adding quantified noise to the logging data to produce an adjusted signal, performing a second DTBB inversion using the adjusted signal to calculate second DTBB solutions, comparing the first DTBB solutions to the second DTBB solutions to determine an uncertainty of the first DTBB solutions based on a relationship of the quantified noise and the difference between the first DTBB solutions and the second DTBB solutions.

In one ore more embodiments, the instructions are operable to change an orientation of the drilling assembly, change an angle of the drilling assembly relative to a drill string, or combination thereof based on the uncertainty of the first DTBB solutions.

In one or more embodiments, the instructions are operable to determine a type of noise present in the logging data, wherein the quantified noise comprises noise of the type present in the logging data.

In one ore more embodiments, the quantified noise comprises Gaussian noise, white noise, random noise, or combinations thereof.

In one or more embodiments, the instructions are operable to perform operations for selecting a subset of the logging data to add the quantified noise, wherein the subset comprises tool measurements from a specific depth within the geologic formation, and wherein performing the second DTBB inversion comprises performing the inversion only on the subset of the logging data.

In one ore more embodiments, the instructions are operable to perform operations for: performing an alternative first DTBB inversion using a different inversion model to calculate alternative first DTBB solutions, performing an alternative second DTBB inversion using the different inversion model to calculate alternative second DTBB solutions, and comparing the alternative first DTBB solutions to the alternative second DTBB solutions to confirm the uncertainty of the first DTBB solutions.

What is claimed is:

1. A method of steering a drilling assembly to form a borehole through a geologic formation, comprising:
   receiving logging data from a borehole tool;
   performing a first distance to bed boundary (DTBB) inversion using the logging data to calculate first DTBB solutions;
   adding quantified noise to the logging data to produce an adjusted signal;
   performing a second DTBB inversion using the adjusted signal to calculate second DTBB solutions; and
   comparing the first DTBB solutions to the second DTBB solutions to determine an uncertainty of the first DTBB solutions based on a relationship of the quantified noise and the difference between the first DTBB solutions and the second DTBB solutions.

2. The method of claim 1, wherein the borehole tool comprises a logging-while-drilling (LWD) tool for generating the logging data.

3. The method of claim 1, wherein the logging data comprises resistivity, gamma ray intensity, borehole pressure, borehole temperature, or any combination thereof.

4. The method of claim 1, comprising steering a drilling assembly through the geologic formation based on the uncertainty of the first DTBB solutions.

5. The method of claim 1, comprising determining a type of noise present in the logging data, wherein the quantified noise comprises noise of the type present in the logging data.

6. The method of claim 1, wherein the quantified noise comprises Gaussian noise, white noise, random noise, or combinations thereof.

7. The method of claim 1, comprising selecting a subset of the logging data to add to the quantified noise, wherein the subset comprises tool measurements from a specific depth from the surface within the geologic formation, and wherein performing the second DTBB inversion comprises using only the subset of the logging data.

8. The method of claim 1, comprising:
   performing an alternative first DTBB inversion using a different inversion model to calculate alternative first DTBB solutions;

performing an alternative second DTBB inversion using the different inversion model to calculate alternative second DTBB solutions; and comparing the alternative first DTBB solutions to the alternative second DTBB solutions to confirm the uncertainty of the first DTBB solutions.

9. A system for drilling a borehole through a geologic formation, comprising:

a processor; and a non-transitory machine-readable medium coupled to the processor and comprising instructions configured to cause the processor to perform operations for:

receiving logging data from a borehole tool;

performing a first distance to bed boundary (DTBB) inversion using the logging data to calculate first DTBB solutions;

adding quantified noise to the logging data to produce an adjusted signal;

performing a second DTBB inversion using the adjusted signal to calculate second DTBB solutions; and comparing the first DTBB solutions to the second DTBB solutions to determine an uncertainty of the first DTBB solutions based on a relationship of the quantified noise and the difference between the first DTBB solutions and the second DTBB solutions.

10. The system of claim 9, comprising a logging tool comprising sensors operable to collect the logging data from the geologic formation.

11. The system of claim 9, wherein the instructions are configured to cause the processor to change an orientation of the drilling assembly, change an angle of the drilling assembly relative to a drill string, or combination thereof based on the uncertainty of the first DTBB solutions.

12. The system of claim 9, wherein the instructions are configured to cause the processor to perform operations for determining a type of noise present in the logging data, wherein the quantified noise comprises noise of the type present in the logging data.

13. The system of claim 9, wherein the instructions are configured to cause the processor to select a subset of the logging data to which to add the quantified noise, wherein the subset comprises tool measurements from a specific depth from surface within the geologic formation, and wherein performing the second DTBB inversion comprises performing the second DTBB inversion only on the subset of the logging data.

14. The system of claim 9, wherein the instructions are configured to cause the processor to perform operations for:

performing an alternative first DTBB inversion using a different inversion model to calculate alternative first DTBB solutions;

performing an alternative second DTBB inversion using the different inversion model to calculate alternative second DTBB solutions; and comparing the alternative first DTBB solutions to the alternative second DTBB solutions to confirm the uncertainty of the first DTBB solutions.

15. A non-transitory, machine-readable medium having instructions encoded thereon, the instructions executed by a processor, are operable to perform operations for:

receiving logging data from a borehole tool located in a geologic formation;

performing a first distance to bed boundary (DTBB) inversion using the logging data to calculate first DTBB solutions;

adding quantified noise to the logging data to produce an adjusted signal;

performing a second DTBB inversion using the adjusted signal to calculate second DTBB solutions; and comparing the first DTBB solutions to the second DTBB solutions to determine an uncertainty of the first DTBB solutions based on a relationship of the quantified noise and the difference between the first DTBB solutions and the second DTBB solutions.

16. The non-transitory, machine-readable media of claim 15, wherein the instructions are operable to change an orientation of a drilling assembly, change an angle of the drilling assembly relative to a drill string, or combination thereof based on the uncertainty of the first DTBB solutions.

17. The non-transitory, machine-readable media of claim 15, wherein the instructions are operable to determine a type of noise present in the logging data, wherein the quantified noise comprises noise of the type present in the logging data.

18. The non-transitory, machine-readable media of claim 15, wherein the quantified noise comprises Gaussian noise, white noise, random noise, or combinations thereof.

19. The non-transitory, machine-readable media of claim 15, wherein the instructions are operable to perform operations for selecting a subset of the logging data to which to add the quantified noise, wherein the subset comprises tool measurements from a specific depth within the geologic formation, and wherein performing the second DTBB inversion comprises performing the second DTBB inversion only on the subset of the logging data.

20. The non-transitory, machine-readable media of claim 15, wherein the instructions are operable to perform operations for:

performing an alternative first DTBB inversion using a different inversion model to calculate alternative first DTBB solutions;

performing an alternative second DTBB inversion using the different inversion model to calculate alternative second DTBB solutions; and comparing the alternative first DTBB solutions to the alternative second DTBB solutions to confirm the uncertainty of the first DTBB solutions.

* * * * *